MAGNETIC READING APPARATUS FOR DEMODULATING A RECORDED FREQUENCY MODULATED SIGNAL
Filed Jan. 30, 1962

INVENTOR.
HENRY RAY WARREN
BY Morris L. Rabkin
ATTORNEY

United States Patent Office 3,218,618
Patented Nov. 16, 1965

3,218,618
MAGNETIC READING APPARATUS FOR DEMODULATING A RECORDED FREQUENCY MODULATED SIGNAL

Henry Ray Warren, Haddonfield, N.J., assignor to Radio Corporation of America, a corporation of Delaware Filed Jan. 30, 1962, Ser. No. 169,719
8 Claims. (Cl. 340—174.1)

This invention relates to a method of and apparatus for reproducing records, and more particularly to a method of and apparatus for reproducing recorded frequency modulated signals.

The embodiment of the invention described herein reproduces magnetic tape records by means of ring type magnetic heads. The inventions may also be used for reproducing disc, drum, wire, and other types of magnetic records and may involve the use of other than ring type magnetic heads. Moreover, the invention may be used for reading other types of magnetic records, as well as for non-magnetic records, which, for example, may be embossed or polarized mechanically or electrically.

It has been the practice to reproduce or read frequency modulated (FM) signals from a magnetic record by the same techniques used to read audio signals and amplitude modulated (AM) signals. The reproduced FM signals are then demodulated in FM discriminator or demodulator circuits. The speed of the record desirably should be kept constant within close limits during reproduction, since record speed variations are reflected as spurious frequency modulation of the signals read therefrom. It is also desirable to use reading circuits which are less complex than the usual FM demodulator circuits for demodulating the FM signals which are derived from the record.

Accordingly, it is an object of the present invention to provide an improved method of and apparatus for reproducing recorded frequency modulated signals, which method and apparatus are simpler, less complicated and less susceptible to record speed variations than known methods and systems for reproducing recorded frequency modulated signals.

It is a further object of the present invention to provide an improved method of and apparatus for reproducing magnetically recorded FM signals wherein demodulation is accomplished, at least partially, within the very magnetic head which scans the record.

It is a still further object of the present invention to provide an improved method of and apparatus for reproducing recorded FM signals, such method and apparatus being operative over a wide range of record speeds.

It is a still further object of the present invention to provide an improved method of and apparatus for reproducing digital information recorded in accordance with a frequency shift keying technique.

It is a still further object of the present invention to provide an improved system for reading recorded FM signals which may employ simple circuitry of a type available at low cost.

Briefly described, the invention, when used for magnetic record reproduction, makes use of a magnetic head having two signal gaps at a certain distance from each other approximately, but not necessarily exactly, equal to the carrier wavelength of the recorded FM signal. Other signal pick-up means, such as separate transducer devices of a type depending on the type of record, separated from each other by the requisite, certain distance, may also be used. The signals derived from the record at each signal gap or at each pick-up means may be balanced electrically or magnetically to obtain a resultant signal. When the FM carrier signal wavelength is approximately equal to the distance between the gaps or pick-up means, the resultant signal is of a certain amplitude. When the frequency shifts, the signals derived at each gap or each pick-up means are not in phase and the resultant signal changes in amplitude from that certain amplitude. The polarity and amplitude of the resultant signal depends upon whether the FM signal wavelength, when the frequency shifts, is larger or smaller than the distance between the gaps or pick-up means. The resultant amplitude modulated, carrier frequency signal may be envelope detected, using the usual type of AM detector, for example, to derive an output signal which is FM demodulated. Since the output signal is a function of wavelength of the FM signals recorded on the tape, which wavelength is not affected by record speed variations during reading, a system using the invention substantially is not susceptible to noise due to record speed variations. The certain distance between the gaps or pick-up means may be approximately a multiple of the recorded FM signal wavelength. The resultant signal remains largely a function of the FM signal wavelength and the distance between the gaps or pick-up means.

The invention itself, both as to its organization and method of operation, as well as additional objects and advantages thereof, will become more readily apparent from a reading of the following description in connection with the accompanying drawings, in which.

Figure 1:
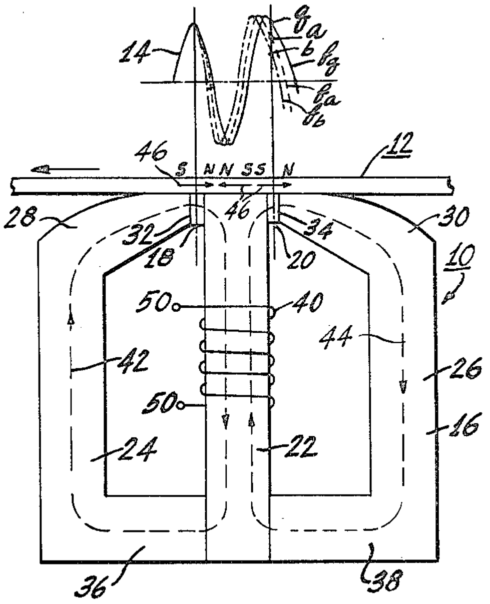
FIG. 1 is a schematic view of a magnetic head shown in cooperation with a magnetic tape recorder which has a frequency modulated signal recorded thereon of sinusoidal waveform.

Referring more particularly to FIG. 1, there is shown a magnetic head 10 for scanning a magnetic tape recorder 12. The tape record has an alternating current signal recorded thereon which may be frequency modulated. This signal is referred to herein as an FM signal. Waveforms 14 of this signal are shown directly above the tape record 12 in FIG. 1. Magnetic signals are recorded on the record 12 having polarities and intensities of magnetization corresponding to the polarity and amplitude of the FM signal represented by the waveform 14. The record 12 may be magnetized in one direction in response to a positive half cycle of the carrier frequency wave and in the opposite direction in response to the negative half cycle of the carrier wave. The directions of magnetization of the record 12 by a ring type head in response to the waveform 14 are shown by arrows 46 along the record 12. The recorded wavelength will depend upon the frequency of waves and the velocity of tape motion in accordance with the relationship $$\lambda=\frac{v}{f}$$

where $\lambda$ is the wavelength of the recorded signal on the tape; $v$ is the velocity of tape motion during recording; and $f$ is the frequency of the signal being recorded.

The magnetic head 10 reads these recorded signals at two positions on the record track of the tape record 12 on which they are recorded. These two positions are spaced from each other by a predetermined distance which is related to the wavelength of the recorded signals at the carrier frequency. To this end, the magnetic head includes a core structure 16 which defines a pair of signal gaps 18 and 20. The core structure 16 includes a center core leg 22 which may be formed from a plurality of laminations of magnetic material, and two side core legs 24 and 26 which also may be formed from a plurality of laminations of magnetic material. The side core legs 24 and 26 are of complementary, U-shape and have tape engageable pole portions 28 and 30 which are, respectively, separated from opposite sides of the center leg 22 by nonmagnetic gap spacers 32 and 34 to define the signal gaps 18 and 20. These gap spacers may be made of beryllium copper or other known materials which have been used as gap spacers. The side core legs 24 and 26 also have back portions 36 and 38 which respectively engage opposite sides of the center leg 22. A signal coil 40 is wound around the center leg 22.

Two magnetic signal or flux paths 42, 44 are defined by the core structure 16. One of these paths 42, as shown by a dash line, extends across the gap 18, through the center leg 22, and through the left side leg 24. The other flux path 44, which is also shown by a dash line, extends across the signal gap 20, through the right side leg 26, and through the center leg 22. The center leg 22 is thus common to both flux paths 42 and 44.

The magnetic head 10 is designed to read frequency modulated recordings of digital information and more particularly of binary type information which is recorded by a frequency shift keying technique wherein a binary bit of one type ("0") is recorded as a signal of frequency $f_a$ higher than the quiescent or carrier frequency $f_q$ which is recorded on the tape, and wherein a binary bit of the opposite type ("1") is recorded as a signal of still higher frequency $f_b$ than that of the quiescent or carrier frequency signal recorded on the tape. The carrier frequency $f_q$ is illustrated in waveform 14 in FIG. 1. The signal gaps 18 and 20 are spaced from each other by a distance slightly more than a wavelength of the signal recorded at the carrier frequency $f_q$. In other words, the center core leg 22 has a predetermined width related to the wavelength of the recorded signal whereby the gaps 18 and 20 are separated by a predetermined distance also related to the recorded signal wavelength. The center line of the first gap 18 coincides with the positive maximum point of the wave 14, whereas the center line of the second gap 20 is slightly advanced in phase and coincides with a point just behind the second crest of the wave 14. The intersection of the waveform 14 with the center line of the second gap 20 is indicated by the letter *q*. The points *a* and *b* designate where points on the higher frequency waves of frequencies $f_a$ and $f_b$, which correspond in phase to the point *q* or wave 14, are when these higher frequency waves are recorded on the tape. The shift in frequency from $f_q$ to $f_a$ and $f_b$ is exaggerated in FIG. 1 for clarity of illustration. Although the width of the center core leg 22 is illustrated in FIG. 1 as being such that the center line of the gaps 18 and 20 are spaced somewhat more than a wavelength of the recorded signal from each other, the spacing between the core legs may be integral multiples of a wavelength of the recorded signal at carrier frequency since the desired phase relationship can be preserved in this way also.

Demodulation of the FM signal recorded on the tape depends upon the difference in phase between the magnetic signals derived from the tape at the first gap 18 and the second gap 20, since the signal resulting from combining the signals derived at the respective gaps 18 and 20 due to their phase difference has an envelope which corresponds to the FM modulation signal.

As will be brought out hereinafter, the signal gaps 18 and 20 may be spaced from each other by a distance greater or less than a wavelength of the recorded signal or an integral multiple of that wavelength, when two signals, respectively, of lower frequency than the carrier frequency are used to convey binary information. When continuous signals, such as audio modulated signals, are recorded on the tape, the signal gaps may suitably be spaced from each other a distance either greater or smaller than the recorded wavelength of the carrier frequency $f_q$ to allow a sufficiently large range of phase variation to accommodate the frequency variations of the recorded signal to which the head may respond. For example, to accommodate maximum frequency variations the gaps may be separated by three-quarter (270°) of a wave length or one and a quarter (450°) of a wavelength.

The center lines of the signal gaps are preferably not located exactly one signal wavelength apart in order to avoid a double frequency response characteristic from the head 10. If the gaps were to be exactly one signal wavelength apart, an increase or a decrease of the recorded wavelength with modulation of the recorded signals would not be distinguishable from each other in the resultant amplitude modulation, since both the increase and decrease would cause corresponding changes in flux in the magnetic head 10. This would result in an output signal from the head which, when demodulated, could be double the frequency of the FM modulating signal. Accordingly, frequency dividers may be required in demodulating the signal. Such frequency dividers may be eliminated by so spacing the signal gaps 18 and 20 from each other so that less than or more than a signal wavelength or an integral multiple thereof separates the center lines of the gaps 18 and 20. It is desirable that the width of the center core leg provides a gap separation of between less than one and greater than three-quarters of a wavelength or integral multiples thereof or more than one and less than one and one-quarter of a wavelength or integral multiples thereof in order to avoid a double frequency response characteristic from the head, and to obtain a sufficiently wide frequency range of operation.

Assuming that the magnetic flux from the tape is polarized in the direction shown by the arrows 46, the direction of the magnetic flux is the same (clockwise) in both flux paths 42 and 44 during pick-up. The magnetic flux in the center leg 22 is in opposition, or in bucking relationship. When the recorded signal $f_q$ is at carrier frequency, and the spacing is exactly one wavelength, the magnetic signal in the flux path 42 is approximately equal in intensity to the intensity of magnetic signal in the flux path 44 so that the net magnetic signal in the center leg 22 due to the combination of the magnetic signals picked up at the gap 18 and the gap 20 is of minimum intensity. The resulting signal derived by the signal coil 40 is, therefore, a minimum when the carrier frequency $f_q$ is recorded on the tape.

In practice, the requisite distance between the gaps 18 and 20 may be obtained by adjusting the distance between the gaps of two different magnetic heads. The outputs of these heads are combined in opposition so that the output of one head is subtracted from the output of the other. The distance between the gaps is adjusted until the combined output is a minimum, but not necessarily a null, when the FM carrier signal is detected from the tape.

When the frequency increases, the signal flux which travels around flux path 42 will then not be in phase with the signal flux which travels around the flux path 44. The net magnetic signal in the center leg 22 is therefore of increased intensity when the frequency increases. The signal winding 40 then derives an output signal in response to the recorded signals of the frequency $f_a$ which is greater than the output signal of the recorded signals $f_q$. When the frequency of the recorded signals is still further increased to $f_b$, the magnetic signals crossing gap 18 and the magnetic signals crossing gap 20 become still further out of phase so that the resultant signal derived by the output winding 40 is then still greater in magnitude when signals of highest frequency $f_b$ are recorded on the tape than when signals of frequency $f_a$ are recorded thereon.

Figure 3:
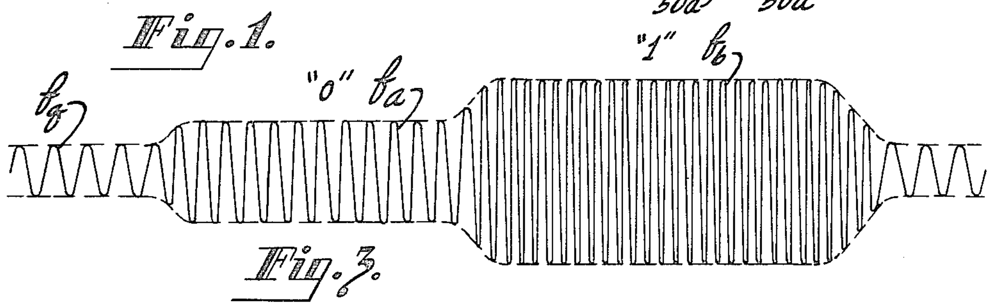
FIG. 3 is a waveform of output signals which may be derived from the head shown either in FIG. 1 or FIG. 2.

The signals derived from the output winding 40 are shown in FIG. 3. It will be observed that the resultant signals from the output 40 have magnitudes determined by the frequency or wavelengths of the recorded signals. The envelope of the resulting signals from the signal coil 40 have different and successively greater amplitudes when (1) the carrier frequency $f_q$ is recorded on the tape; (2) the frequency $f_a$ representing a binary "0" bit is recorded, and (3) the frequency $f_b$ representing a binary "1" bit is recorded on the tape. If the distance between the gap center lines 32 and 34 corresponded to exactly one wavelength at carrier frequency ($f_q$) then the signal output at $f_q$ would be nominally zero voltage.

Figure 4:
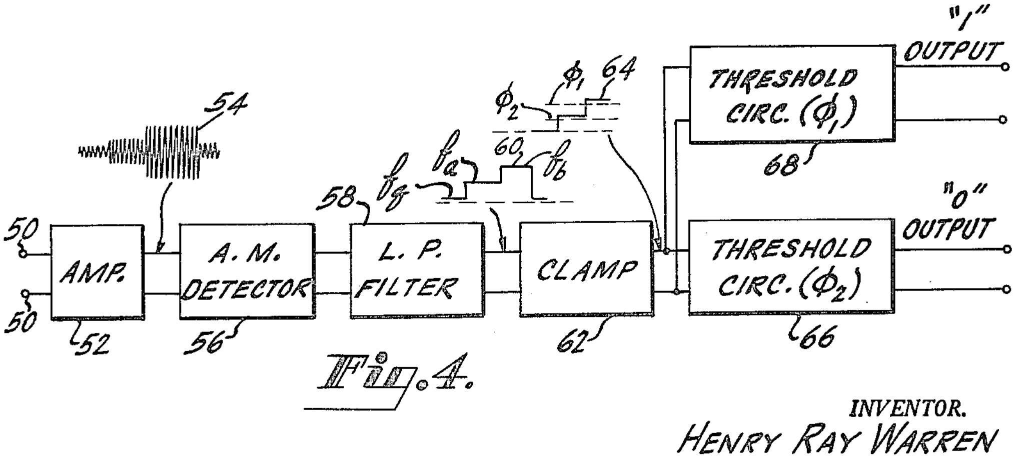
FIG. 4 is a block diagram of a system of circuits which may be used to respond to the signals derived from the head.

A system of circuits for recovering the digital information from the resultant signals obtained from the signal coil 40 is shown in FIG. 4. The output terminals 50 of the signal coil 40 are connected to the input of an amplifier 52. This amplifier 52 may be of the usual type capable of amplifying signals over the band of frequencies including $f_q$, $f_a$ and $f_b$. The amplified signals, as shown by the wave 54, are applied to an amplitude modulation detector 56. This detector is an envelope detector. For example, the detector may be a diode polarized to pass the components of the wave 54 which are positive with respect to circuit ground. Associated with the diode detector 56 is a low pass filter 58 which may be an R.-C. (resistance-capacitance) filter of the type which is normally associated with diode rectifiers in amplitude modulation detectors. The output of the low pass filter 58 is a staircase waveform 60 corresponding to the envelope of the wave 54, the lower step of which corresponds to the carrier frequency $f_q$ and the successively higher steps of which correspond, respectively, to the shifted frequencies $f_a$ and $f_b$. This staircase wave 60 is clamped, for example, to circuit ground by a clamping circuit 62 of the type known in the art. The clamped wave 64 at the output of the clamping circuit 62 is applied to trigger circuits 66 and 68. These circuits 66 and 68 may be monostable multi-vibrator type trigger circuits having successively higher thresholds $\phi_2$ and $\phi_1$, respectively. Accordingly, the trigger circuit 66 will be triggered when signals of frequency $f_a$ are read from the tape by the head 10. The output of the threshold circuit 66 is indicative of a binary "0" bit. The threshold circuit 68 is triggered only in response to signals which exceed its threshold level $\phi_1$. Since this threshold level is exceeded when signals of frequency $f_b$ are read from the tape, the threshold circuit 68 responds by providing an output indicative of a binary "1" bit when signals of frequency $f_b$ are read from the tape. Binary logic circuitry of conventional design may be used to cut off the "0" output when the "1" output is produced.

Figure 2:
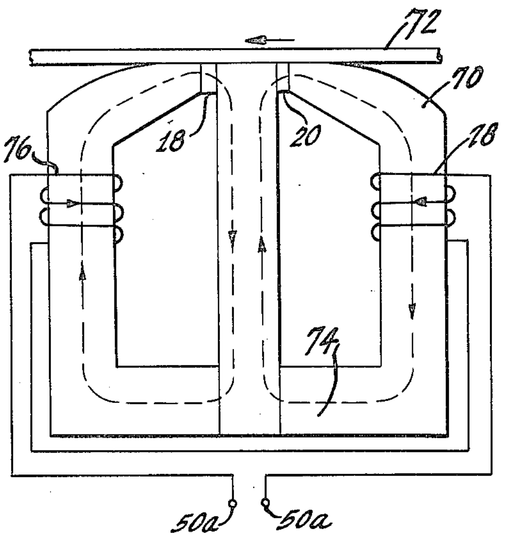
FIG. 2 is a view similar to FIG. 1 showing another magnetic head which may be used in practicing the invention.

Referring to FIG. 2, there is shown a magnetic head 70 for reading a magnetic record 72. The head 70 has a core structure 74 which is similar to the core structure 16 of the head 10. However, instead of using a signal winding around the center leg of the core structure 74, two signal windings 76 and 78 are wound in opposite senses about the side core legs. These signal windings 76 and 78 are interconnected in series opposition. The signal windings 76 and 78 translate the flux in the side legs of the core 74 into separate electrical signals. These signals are then combined in opposing relationship electrically across a load to which output terminals 50*a* of the interconnected windings 76 and 78 are connected. This load may be the input resistance of the amplifier 52 (FIG. 4).

It will be apparent from the foregoing description that there has been provided an improved method of and apparatus for demodulating an FM signal recorded on a record. While a magnetic head in association with a magnetic tape record has been described in detail, it will be apparent that other physical and electrical records wherein wavelengths of an FM signal are repeatedly recorded may be read through the use of appropriate apparatus and the method of the present invention. Accordingly, the foregoing description should be taken merely as being illustrative and not in any limiting sense.

What is claimed is:

1. Apparatus for reading a magnetic record having binary information recorded along a track thereon in the form of a signal shifted in frequency from a first frequency to a second frequency to represent a binary bit of first value and from said first frequency to a third frequency to represent a binary bit of second value, said apparatus comprising
   (a) means for scanning said track to derive therefrom magnetic signals at different positions thereon spaced from each other by a distance slightly different from the recorded wavelength of said first signal or an integral multiple thereof,
   (b) means for deriving a resultant signal corresponding to the difference in magnitude between said magnetic signals,
   (c) means for detecting the envelope of said resultant signal to provide an output signal,
   (d) means for clamping said output sgnal to a reference signal level, and
   (e) a pair of trigger circuits responsive to said output signal, each of said circuits being operable when the input signal thereto exceeds a different signal level for separately providing outputs corresponding, respectively, to bits of said first value and to bits of said second value.

2. Apparatus for reading a magnetic record having binary information recorded along a track thereon in the form of a signal shifted in frequency from a first frequency to a second higher frequency to represent a binary bit of one value and from said first frequency to a third and still higher frequency to represent a binary bit of another value, said apparatus comprising
   (a) means for scanning said track to derive therefrom magnetic signals at different positions thereon spaced from each other by a distance slightly less than the recorded wavelength of said first signal or an integral multiple thereof,
   (b) means for deriving a resultant signal corresponding to the difference in amplitude between said magnetic signals,
   (c) means for detecting the envelope of said resultant signal to provide an output signal,
   (d) means for clamping said output signal to a reference signal level, and
   (e) a pair of trigger circuits responsive to said output signal, each of said circuits being operable when the input signal thereto exceeds a different signal level for separately providing outputs corresponding, respectively, to different ones of said bits.

3. Apparatus for demodulating a frequency modulated signal recorded along a path on a record comprising,
   a single magnetic head signal responsive means disposed along said path for picking up said recorded signal at positions spaced from each other by a distance approximately equal to an integral multiple of the wavelength of said recorded signal and for simultaneously producing by itself a resulting signal condition corresponding to the magnitude and sense of the difference between the signals picked up at said spaced positions, and means responsive to said resulting signal condition for providing an output signal corresponding to said recorded frequency modulated signal in demodulated form.

4. Apparatus for reading a magnetic record having a signal recorded along a record track thereon, which signal is modulated in frequency, said apparatus comprising,
   a single magnetic head means for deriving from said track signals recorded on said track at first and second positions spaced from each other by a distance related to the wavelength of said recorded signal and for simultaneously producing by itself a resultant signal related to the magnitude and sense of the difference between the signals derived at said spaced positions, and means for envelope detecting said resultant signal to provide an output signal related to the modulation of said recorded signal.

5. Apparatus for reading a magnetic record having a signal recorded along a record track thereon, which signal is modulated in frequency, said apparatus comprising, a single magnetic head means for deriving from said track signals recorded on said track at first and second positions spaced from each other by a distance related to a wavelength of said recorded signal, said means including a common path core portion over which said derived signals pass in opposing relationship, a signal winding constituting the only connection to said head means and linking said common path core portion for providing a resultant signal related to the sense and magnitude of the difference between said derived signals, and means for envelope detecting said resultant signal to provide an output signal related to the modulation of said recorded signal.

6. Apparatus for reading a magnetic record having a signal recorded along a record track thereon, which signal is modulated in frequency, said apparatus comprising, a single magnetic means disposed along said track for deriving signals recorded on said track at first and second positions spaced from each other at a distance approximately equal to an integral multiple of the wavelength of said recorded signal, said means including a common path portion through which said derived signals pass in opposing relationship, a pair of signal windings arranged on said means and connected in bucking relationship with each of said windings being individually responsive to one of said derived signals for providing a resulting signal related to the sense and magnitude of the difference between said derived signals, and means connected to said windings for envelope detecting said resulting signal to provide an output signal determined by the modulation of said recorded signal.

7. Apparatus for reading a magnetic record having a signal recorded thereon along a record track, which signal is frequency modulated, said apparatus comprising, a magnetic head including a core structure having a pair of side core legs positioned on opposite sides of a center core leg to form a pair of similar signal gaps spaced from each other along said track in a recorded signal pickup relationship and at a distance related to the wavelength of said recorded signal, said signal gaps each being dimensioned and arranged to derive a signal from said track with said derived signals passing through said center core leg in opposing relationship, a signal winding constituting the only winding on said structure positioned on said center core leg and responsive to the resulting signal present in said center core leg determined by the magnitude and sense of the difference between said derived signals, and circuit means including an amplitude modulation detector circuit coupled to said winding for deriving an output signal.

8. Apparatus for reading a magnetic record having binary information recorded along a track thereon in the form of a signal shifted in frequency from a first frequency to a second frequency to represent a binary bit of first value and shifted to a third frequency to represent a binary bit of second value, said apparatus comprising, a magnetic head including a pair of signal gaps by which said head is operated to pick up said recorded signal simultaneously at different positions on said track with said signal gaps being spaced from each other a distance slightly different from the recorded wavelength of said first signal or an integral multiple thereof, means for deriving a resultant signal corresponding to the difference in magnitude between said signals picked up at said different positions, means for detecting the envelope of said resultant signal to provide an output signal, and means responsive to said output signal for providing a second output signal corresponding to said bits of said first value and a third output signal corresponding to said bits of said second value.

References Cited by the Examiner

UNITED STATES PATENTS

| | | | |
|---|---|---|---|
| 2,762,013 | 9/1956 | Chandler | 179—100.2 |
| 2,803,708 | 8/1957 | Camras | 179—100.2 |
| 2,945,212 | 7/1960 | Shekels et al. | 340—174.1 |
| 2,947,929 | 8/1960 | Bower | 340—174.1 |
| 2,975,240 | 3/1961 | Berry | 179—100.2 |
| 2,975,241 | 3/1961 | Camras | 179—100.2 |

IRVING L. SRAGOW, *Primary Examiner.*